Jan. 14, 1936.  E. R. DE LUIZ  2,027,815
SEAL
Filed June 12, 1926
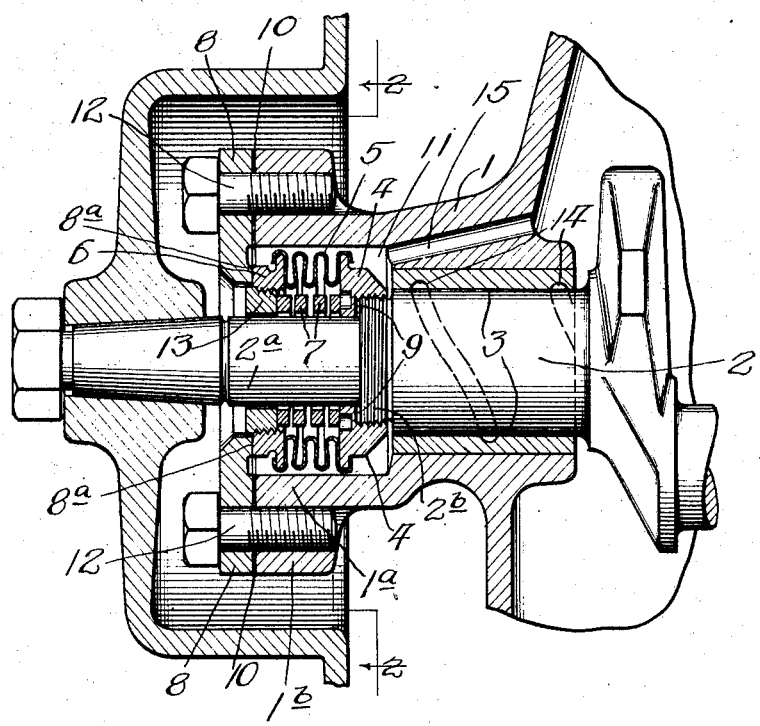
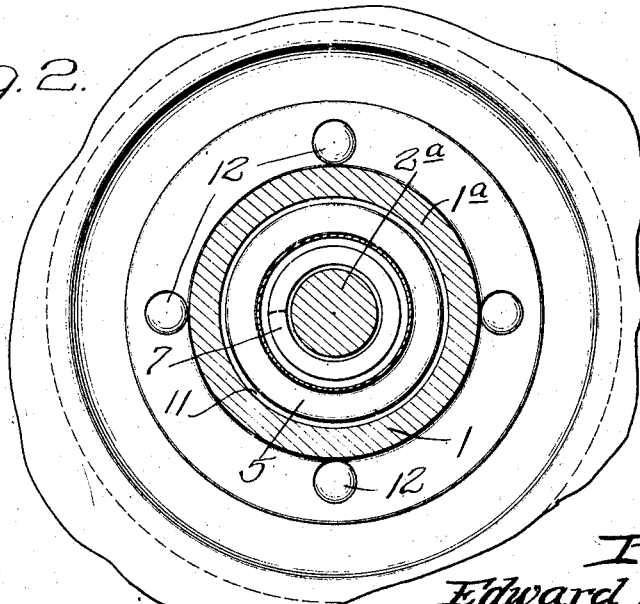
Inventor:
Edward R. De Luiz,
By Griffith, Lee Chritton & Wiles,
Attys Patented Jan. 14, 1936

2,027,815

UNITED STATES PATENT OFFICE 2,027,815

SEAL

Edward R. De Luiz, Chicago, Ill., assignor, by mesne assignments, to Apex Electrical Manufacturing Company, Cleveland, Ohio, a corporation of Ohio Application June 12, 1926, Serial No. 115,601

8 Claims. (Cl. 286—11)

This invention relates to improvements in seals and more especially a seal adapted for use in connection with a bearing. The invention is of especial value in connection with any kind of pump, compressor, apparatus, or machinery having a bearing where it is advisable or desirable to maintain different pressures on the two sides of the bearing. One of the functions of my seal is to prevent the escape of gas or liquid from one side of the bearing to the other.

For example, in refrigerating apparatus, where the pressure inside of the compressor casing is usually different from the atmospheric pressure outside, sometimes being very high or very low, by the use of my invention, a seal may be provided to hold the gases and liquids and prevent the entrance of air, or the escape of a refrigerant in either its gaseous or liquid form, at the point where the main shaft projects through the wall of the casing.

Among the features of my improved seal is the simplicity of its design and the ease of manufacturing and assembling. It is so designed and constructed that the various parts may be cast, machined, hardened, or polished where necessary with the minimum of labor.

My improved seal is very durable and effective. Improved oiling means are also provided. Other features and advantages of my invention will appear as I proceed more fully with my specification.

In that form of device embodying the features of my invention shown in the accompanying drawing, Fig. 1 is a vertical sectional view of my sealing device, and Fig. 2 is a view taken as indicated by line 2 of Fig. 1.

As shown in the drawing, 1 indicates a portion of a casing, for example, the casing of a compressor such as is used in refrigerating apparatus. 3 indicates one of the main bearings carrying the crank shaft 2 which drives the usual connecting rod connected to a piston (not shown).

The casing 1 adjacent the bearing 3 projects outwardly some distance, as indicated by 1$^a$ to form a cavity 11 outside of the bearing. The outer edge of the casing extension 1$^a$ is widened or flanged outwardly as indicated by 1$^b$.

The shaft 2 is provided with an extension 2$^a$ reduced in diameter extending through the cavity 11.

The cavity 11 forms a housing for the seal which I will now describe more in detail. Just outside the bearing 3, the shaft 2 is provided with threads as indicated by 2$^b$. Threaded on this portion of the shaft is a collar 4 screwed up tightly and hermetically sealed to the shaft by the gasket 9. A longitudinally expansible cylindrical sheath 5 has one end hermetically sealed to the collar 4 and the other end to a sealing ring 6, which for convenience of assembly is here shown as made of two parts and which preferably is constructed of anti- or non-friction metal, or so-called self-lubricating metal.

The outer end of the cavity 11 is closed by means of a cover plate 8 fastened to the rim 1$^b$ by means of the machine screws 12. Gasket 10 is provided between the cover 8 and the end of the casing in order to make a tight closure, so that the cover when in place virtually forms a part of the casing. The cover 8 is provided with a central aperture for the end of the shaft 2$^a$ to project through. The margin 8$^a$ on the inner face of the cover 8 around the central aperture, where the sealing ring 6 contacts with the same is hardened in order to lessen or eliminate wear between the sealing ring and the cover.

It is to be noted that the cover plate 8 is a substantially flat circular piece of metal. Because of this shape, it will be seen that this cover plate may be very easily manufactured. It is to be noted also that the inner face of this plate when in contact with the gasket 10 and the hardened margin 8$^a$ surrounding the central aperture, are, or may be, in substantially the same plane. For this reason, these two faces may be very easily smoothed or polished in one operation. The cover plate being relatively small, the hardening of the margin 8$^a$ is also comparatively easily accomplished.

Threaded on the inside of the sealing ring 6 and lying between it and the extension 2$^a$ of the shaft is a spring tension nut 13 forming a seal for the spiral compression spring 7 lying inside of the sheath 5, and having its other end bearing against the collar 4. The spring 7 operates to yieldingly press the sealing ring 6 against the hardened margin 8$^a$ of the casing 8. The spring tension nut 13 may be screwed inwardly or outwardly in order to give the desired spring tension.

For the purpose of oiling the seal and bearing there is provided a spiral oil groove 14 adapted to carry oil from the interior of the casing through the bearing and into the cavity 11 thus oiling all parts of the seal. 15 indicates an oil relief port leading from the cavity 11 back to the interior of the casing to permit escape of excess oil from the cavity 11 back to the interior of the casing.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. In a device of the character described; a casing; a bearing in said casing; a shaft journaled in said bearing; a longitudinally expansible cylindrical sheath surrounding the shaft and having one end hermetically attached thereto; a sealing ring hermetically attached to the other end of said sheath and adapted to contact with the casing; means for holding said sealing ring in contact with said casing, said means comprising a spiral spring surrounding said shaft and lying inside of said sheath; and means for adjusting the tension of said spring, said spring adjusting means comprising a spring seat threaded in said sealing ring and located in an aperture formed in the side of said casing.

2. In a device of the character described; a casing; a bearing in said casing; a shaft journaled in said bearing; a projection on said casing adjacent the bearing to form a cavity around said shaft; a longitudinally expansible cylindrical sheath surrounding the shaft, lying inside of said cavity, and having one end hermetically attached to said shaft; a sealing ring hermetically attached to the other end of said sheath and adapted to contact with said projection on said casing; and means for holding said sealing ring in contact with said projection on said casing, said means comprising a spiral spring surrounding said shaft and lying inside of said sheath, and an adjustable spring feed threaded in said sealing ring by way of an aperture formed in the side of said casing.

3. In a device of the character described; a casing; a bearing in said casing; a shaft journaled in said bearing; a projection on said casing adjacent the bearing to form a cavity around said shaft; a cover for the outer end of said cavity, said cover being provided with an aperture to accommodate said shaft; a longitudinally expansible cylindrical sheath surrounding the shaft lying inside of said cavity, and having one end hermetically attached to said shaft; a sealing ring hermetically attached to the other end of said sheath and adapted to contact with the inner face of said cover; and means for holding said sealing ring in contact with said cover, said means comprising a spiral spring surrounding said shaft and lying inside of said sheath, and an adjustable spring feed in the aperture of said cover threaded in said sealing ring.

4. In combination with a compressor having a casing and a shaft, a shaft seal comprising a collar threaded onto the shaft, a longitudinally expansible cylindrical sheath surrounding the shaft and hermetically sealed at one of its ends to said collar, a sealing ring surrounding said shaft and hermetically sealed to the other end of said sheath, a spiral spring on said shaft surrounded by said sheath and an exteriorly accessible spring tension adjusting element slidably mounted on the shaft and threaded into said ring.

5. In combination with a compressor having an apertured casing, a shaft journalled in said casing and an apertured cover plate for the aperture in said casing through which the shaft extends, a shaft seal comprising a collar fixed to said shaft, a longitudinally expansible sheath surrounding said shaft and hermetically sealed at one of its ends to said collar, a sealing ring hermetically sealed to the other end of said sheath and bearing against said cover plate, a spiral spring on said shaft and lying inside of said sheath and a spring tension adjusting element axially movable on said shaft and threaded into said sealing ring, said element having an annular part axially offset from said sealing ring and having its periphery contiguous to the margin of the aperture of said cover plate.

6. In a device of the character described; a casing; a bearing in said casing; a shaft journaled in said bearing; a longitudinally expansible cylindrical sheath surrounding the shaft and having one end hermetically attached thereto; a sealing ring hermetically attached to the other end of said sheath and adapted to contact with the casing; means for holding said sealing ring in contact with said casing, said means comprising a helical spring surrounding said shaft and lying inside of said sheath; and means accessible from the exterior of said casing for adjusting the tension of said spring.

7. In a device of the character described; a casing; a bearing in said casing; a shaft journaled in said bearing; a longitudinally expansible cylindrical sheath surrounding the shaft and having one end hermetically attached thereto; a sealing ring hermetically attached to the other end of said sheath and adapted to contact with the casing; means for holding said sealing ring in contact with said casing, said means comprising a spiral spring surrounding said shaft and lying inside of said sheath; and means for adjusting the tension of said spring without breaking the seal between said casing and sealing ring.

8. In a device of the character described; a casing; a bearing in said casing; a shaft journaled in said bearing; a longitudinally expansible cylindrical sheath surrounding the shaft and having one end hermetically attached thereto; a sealing ring hermetically attached to the other end of said sheath and adapted to contact with the casing; means for holding said sealing ring in contact with said casing, and means accessible from the exterior of said casing and exposed on all sides to atmospheric pressure for adjusting the tension of said spring.

EDWARD R. DE LUIZ.